Feb. 4, 1930.   R. E. McINTOSH   1,746,046
DRILL
Filed April 3, 1926   2 Sheets-Sheet 1
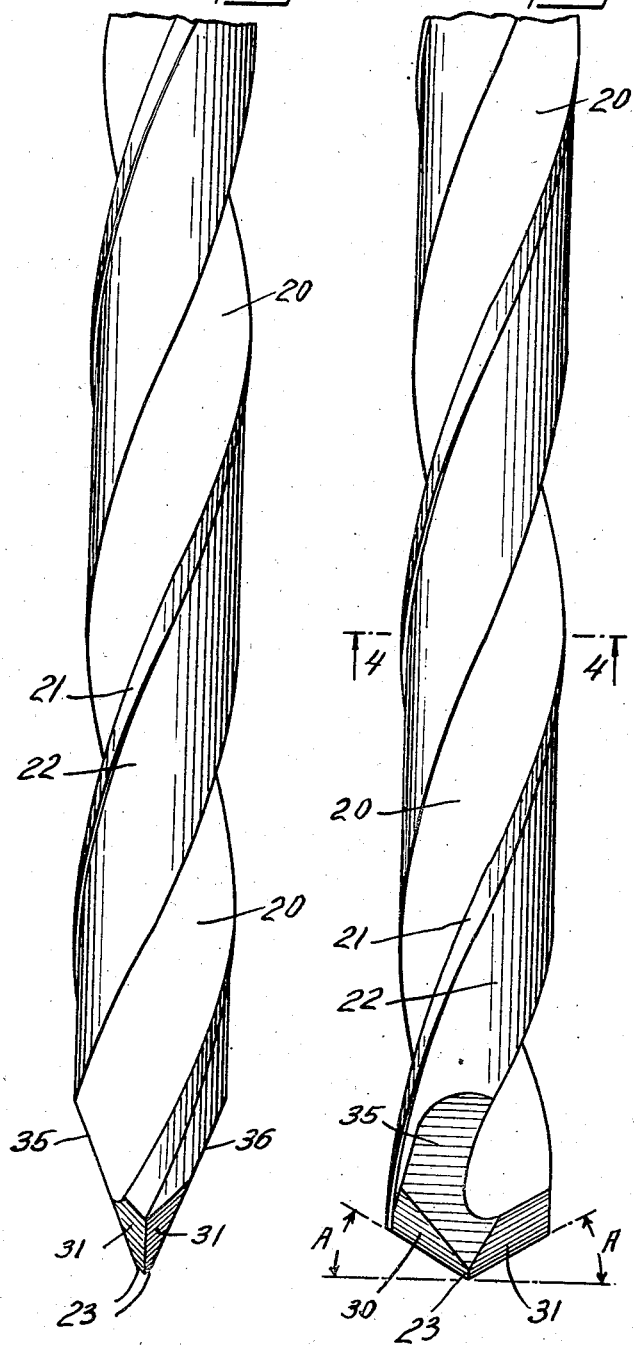
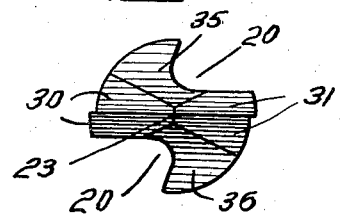
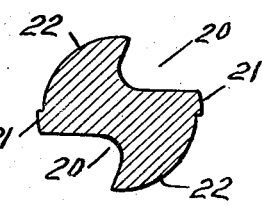
INVENTOR
Roy E. McIntosh
BY
ATTORNEYS

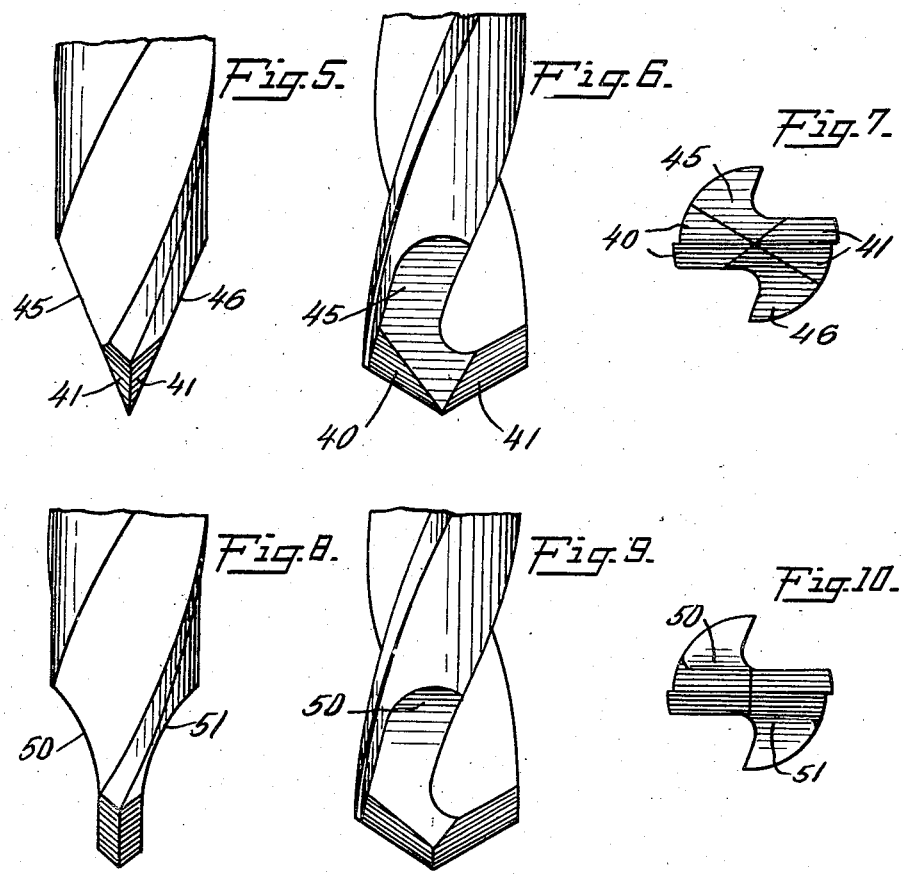

Patented Feb. 4, 1930

1,746,046

UNITED STATES PATENT OFFICE

ROY E. McINTOSH, OF NEW YORK, N. Y., ASSIGNOR, BY MESNE ASSIGNMENTS, TO J. EDWARD OGDEN COMPANY, OF NEW YORK, N. Y., A CORPORATION OF NEW JERSEY

DRILL

Application filed April 3, 1926. Serial No. 99,477.

This invention relates to drills and particularly to drills adapted for use in drilling concrete, brick, stone or cementitious material by percussion.

The invention has for its salient object to provide a drill so constructed that it will operate at a higher speed than the usual drill of its type.

Another object of the invention is to provide a drill adapted for use in masonry and so constructed that it will make a truer hole than the usual drill of that type and will not stick or jamb in the hole.

Further objects of the invention will appear from the following specification taken in connection with the drawings, which form a part of this application, and in which Fig. 1 is an elevational view showing a drill constructed in accordance with the invention;

Fig. 2 is an elevational view taken at right angles to Fig. 1;

Fig. 3 is an end elevation of the point or cutting end of the drill shown in Fig. 2;

Fig. 4 is a transverse sectional elevation taken substantially on line 4—4 of Fig. 2;

Figs. 5 and 6 are elevational views broken away and taken at right angles to each other of a slightly modified form of drill constructed in accordance with the invention;

Fig. 7 is an end elevation of the drill shown in Fig. 6;

Figs. 8 and 9 are elevational views taken at right angles to each other of another drill constructed in accordance with the invention, these views showing the cutting end of the drill; and Fig. 10 is an end elevation of the cutting end of the drill shown in Fig. 9.

The invention briefly described consists of a drill particularly adapted for drilling concrete, brick, stone or cementitious material by percussion. The cutting end or point of the drill is beveled or ground at an angle to provide lip edge clearance and the point is also ground on opposite sides of the center to provide lip clearance. In addition to having lip clearance and lip edge clearance, the end of the drill is further ground and on a steeper angle than the planes providing the lip clearance for the purpose of providing further clearance which may be termed secondary lip clearance. By providing the point or cutting end with secondary lip clearance, it has been found that the drill will operate faster and will not stick or jamb. The secondary lip clearance may be formed by grinding the opposite sides of the point in planes at a relatively steep angle to the vertical, such as 22° or, if desired, the drill may be hollow ground or concaved on its opposite sides. This form of grinding is an advantage in that it permits frequent grinding of the point without materially increasing the cross section of the point of the drill. The terms primary and secondary as applied to clearances and grindings in this application do not refer to the procedure in manufacturing these drills. The secondary lip clearances are preferably formed first and the lip clearances ground thereafter. Although this is the preferred method, it is obvious that the order of procedure may be reversed. Further details of the invention will appear from the following description.

Figs. 1 to 4 inclusive illustrate a twist drill having spiral flutes 20, peripheral portions 21 termed the margins which have the full diameter of the drill stock and extend laterally beyond the remaining peripheral portions 22 termed land clearance. This drill, as shown, has double spiral grooves forming a drill with a twisted central web and enlarged peripheral portions.

The portions between the grooves or flutes 20, on which the margins 21 and land clearance 22 are formed, are termed lands. If the margins were omitted, the lands would extend to the full diameter of the drill.

The cutting end or point of the drill is ground on opposite sides of its center on an angle A to provide lip edge clearance and the opposite sides of the point or cutting end of the drill are ground as shown at 30, 31 to provide lip clearance. The plane surfaces 30, 31 as shown in Figs. 1 to 3 are disposed substantially at 45° to the vertical plane and meet in a line 23 at the point of the drill.

In addition to being ground in a manner to provide lip clearance, the cutting end of the drill is also ground as shown at 35 and 36 to provide secondary lip clearance and it will be noted that the planes indicated at 35 and 36 are disposed at a steeper angle to the vertical than the planes 30, 31 preferably at about 22° to the vertical. The surfaces 35 and 36 are ground on the lands and are preferably substantially flat but may vary to some extent without interfering with the operation of the drill.

In the embodiment of the invention shown in Figs. 5, 6 and 7, the plane surfaces 40 and 41 which correspond to plane surfaces 30 and 31 of the form of the invention shown in Figs. 1 to 3 actually intersect at the point of the drill in a point only and the plane surfaces 45 and 46 which form the secondary lip clearance also similarly intersect at the point of the drill.

In the embodiment of the invention shown in Figs. 8, 9 and 10, the secondary lip clearance is formed by concaving or hollow grinding the end of the drill as shown at 50 and 51. It will be evident from the showing in Fig. 8 that the point of the drill can be ground repeatedly without materially increasing the cross section of the point.

The drills described above are all percussion drills. In the operation of drilling with the ordinary percussion drill without the secondary lip clearance, dust is packed between the lip clearance surfaces and the bottom of the hole. The dust absorbs a part of the energy of the blow and materially reduces the cutting effect of the drill. However, with the drills illustrated and hereinbefore described in which a secondary lip clearance is provided, the dust escapes into the spaces provided by the secondary lip clearances, thus making the blows more effective and speeding up the cutting. Furthermore, the point of the drill is sharper, which increases the speed of cutting.

With the old type of point, moreover, there is greater wear toward the outer edges of the lip edge clearance than at the center. In the drills described, however, the drill is sharper at the center, thus concentrating the cutting at the center and equalizing the wear.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. A twist drill having spiral lands and a beveled point or cutting end, the point being ground on opposite sides of the center of the drill to provide lip clearance and being further ground at a steeper angle to provide tapered substantially flat ground surfaces, said surfaces being ground on the spiral lands of the drill.

2. A percussion drill having spiral lands and a V-shaped cutting end, the end being beveled on opposite sides of a plane passing through the longitudinal center line of the drill to provide flat surfaces narrower at the center of the drill than at the periphery thereof, the ends of the lands being also ground to provide substantially flat surfaces on opposite sides of said plane and extending at a taper to each other to the outer edges of the beveled flat surfaces.

3. A twist drill having a point and double spiral lands and flutes alternating with the lands, the drill on opposite sides of the point being ground to form a V-shaped cutting edge, and the lands being ground at a steeper angle to the drill axis than the cutting edge.

4. A twist drill having a point and double spiral lands and flutes alternating with the lands, the drill on opposite sides of the point being ground to form a V-shaped cutting edge, and the lands being ground to provide substantially flat ground surfaces disposed at a steeper angle to the drill axis than the cutting edge.

5. A twist drill having a point and double spiral lands and flutes alternating with the lands, said lands being substantially uniform in width throughout their lengths, the drill on opposite sides of the point being ground to form a V-shaped cutting edge, and the lands being ground at a steeper angle to the drill axis than the cutting edge.

6. A percussion twist drill having spiral lands and a beveled point or cutting end, the point being ground on opposite sides of the center of the drill to provide lip clearance and being further ground to provide surfaces extending to and intersecting the lands.

7. A percussion twist drill having spiral lands and a beveled point or cutting end, the point being ground on opposite sides of the center of the drill to provide lip clearance and being further ground to provide surfaces extending to and intersecting the lands, said last named surfaces and said lip clearance surfaces intersecting in a common point.

8. A percussion twist drill having spiral lands and a beveled point or cutting end, the point being ground on opposite sides of the center of the drill to provide lip clearance and being further ground to provide surfaces extending to and intersecting the lands and the lip clearance surfaces.

9. A percussion twist drill having a point and spiral lands and beveled portions at the cutting end ground to provide lip clearances, and being further ground to provide surfaces having steeper angles than the said beveled portions and intersecting therewith substantially at a point.

10. A drill having a point and a plurality of lands and flutes alternating with the lands, the drill on opposite sides of the point being ground to form a V-shaped cutting edge and the lands being ground at a steeper angle than the cutting edge.

11. A drill having a point and a plurality of lands and flutes alternating with said lands, the drill on opposite sides of the point being ground to form a V-shaped cutting edge, and the lands being ground to provide substantially flat ground surfaces disposed at a steeper angle to the drill axis than the cutting edge.

12. A drill having a point and a plurality of lands extending the full length of the hole entering portion of the drill and flutes alternating with the lands, said lands being substantially uniform in section throughout their lengths, the drill on opposite sides of the point being ground to form a V-shaped cutting edge, and the lands being ground at a steeper angle to the drill axis than the cutting edge.

13. A percussion drill having depressed portions forming lands therebetween and a bevelled point or cutting end, the point being ground on opposite sides of the center of the drill to provide lip clearances, and being further ground to remove portions of the lands to provide tapered surfaces intersecting the periphery of the lands and intersecting the lip clearances.

14. A percussion drill having lands and a bevelled point or cutting end, the point being ground on opposite sides of the center of the drill to provide lip clearances and being further ground to provide tapered surfaces intersecting said lip clearances at a common point.

15. A percussion drill having a plurality of lands, and a bevelled point or cutting end, the point being ground on opposite sides of the center of the drill to provide lip clearance surfaces and being further ground to provide tapered surfaces each intersecting a plurality of lands and lip clearance surfaces.

16. A percussion drill having a plurality of lands, and a bevelled point or cutting end, the point being ground on opposite sides of the center of the drill to provide lip clearance surfaces and being further ground to provide tapered surfaces each intersecting a plurality of lands and lip clearance surfaces, all surfaces meeting substantially at a point.

In witness whereof, I have hereunto set my hand this 31st day of March, 1926.

ROY E. McINTOSH.